United States Patent [19]
Greenlaw

[11] 3,744,014
[45] July 3, 1973

[54] SUS CABLE TROLLEY

[75] Inventor: Albert H. Greenlaw, Silver Spring, Md.

[73] Assignee: The United States of America as represented by the Secretary of the Navy, Washington, D.C.

[22] Filed: Dec. 3, 1971

[21] Appl. No.: 204,566

[52] U.S. Cl............ 340/3 T, 114/235 B, 294/83 R, 340/5 R
[51] Int. Cl............................................. B63b 21/00
[58] Field of Search ............... 9/400; 254/148, 196; 294/83 R; 114/235 R, 235 B; 340/3 T, 4 R, 5 R

[56] References Cited
UNITED STATES PATENTS
3,499,411  3/1970  Savoie........................ 114/235 B
2,690,846  10/1954  Putnam........................ 294/83 R Primary Examiner—Richard A. Farley
Attorney—R. S. Sciascia and Thomas O. Watson, Jr.

[57] ABSTRACT

A system providing a cable trolley which will launch an underwater sound signal directly beneath a hydrophone. The distance between the two can easily and accurately be determined which will establish the level of acoustic energy produced. In operation, the rollers of the trolley are placed on the cable which has a hydrophone mounted at the bottom thereof and a stop plate directly above the hydrophone. An L-shaped rod on the trolley is depressed to retract a pin in a U-shaped block which receives and engages a ring. A cable is then attached to the ring and to an underwater sound signal. The trolley carrying the signal travels down the cable until the L-shaped rod strikes the stop plate adjacent the hydrophone which releases the ring and thus the signal.

12 Claims, 6 Drawing Figures

PATENTED JUL 3 1973 3,744,014

SUS CABLE TROLLEY

BACKGROUND OF THE INVENTION

1. Field of the Invention

The present invention relates generally to trolley, and more particularly to a cable trolley which will launch an underwater sound signal directly beneath a hydrophone.

2. Description of the Prior Art

Underwater sound signals have been used for many years by scientists, oceanographers, and others as a high energy acoustic source. A prime difficulty has existed in trying to establish a level of acoustic energy produced. The energy is measured on a hydrophone deployed in the ocean. Because of currents, cable sag, etc., the exact location of the hydrophone is seldom known. Thus, when sound signal is launched, it has been almost impossible to determine the distance from the signal to the hydrophone.

SUMMARY OF THE INVENTION

The present invention provides a simple means for deploying an underwater sound signal or other object at a known location in the ocean. This device quickly fastens to and travels down a cable of almost any size deployed in the water. Upon striking the stop plate, or other device, it will release any object it is transporting. The cable trolly will therefore drop the signal directly beneath a hydrophone. Both the detonation depth and the hydrophone depth can be easily determined so that the distance between the two can be obtained by subtraction.

OBJECTS OF THE INVENTION

An object of the present invention is to provide a simple means for deploying an underwater sound signal or other object at a known location in the ocean.

Another object is to automatically drop a sound signal directly beneath an underwater hydrophone.

A further object of the invention is to provide a trolley which travels along a cable smoothly, with less danger of becoming hung up before reaching its destination.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
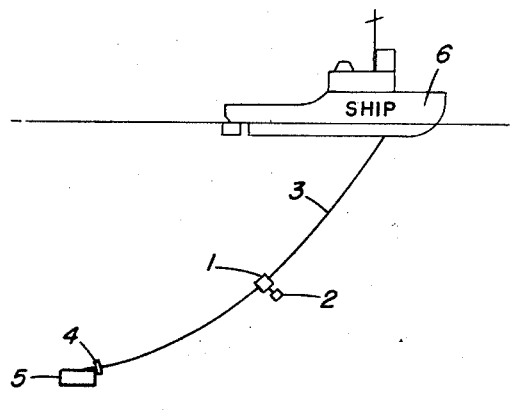
FIG. 1 shows that testing system of the instant invention with the trolley traveling down the cable.
Figure 2:
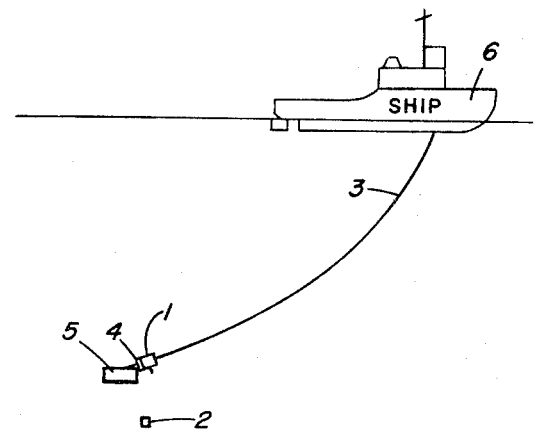
FIG. 2 shows the trolley at its destination.

FIG. 1 shows a ship 6 floating on the ocean with a cable or line 3 extending downwardly into the water. It is virtually impossible to keep a line or cable such as line or cable 3 straight because of such variables as the ocean currents. At the bottom end of cable 3 is attached a hydrophone 5. Just above hydrophone 5 is a stop plate 4. As shown in FIG. 1, trolley 1 with sound signal 2 attached thereto is traveling down cable 3 by the force of gravity. Once trolley 1 reaches stop plate 4 as shown in FIG. 2, sound signal 2 is automatically released and dropped into the ocean directly below hydrophone 5. Sound signal 2 may be a timed explosive device, or other explosive device, a continuous sound signal, intermittant sound signal, a pressure detonated explosive device, etc. The distance between the hydrophone 5 and sound signal 2 can be easily and accurately determined by known methods, for example as explained in an article by P. E. Schmidt, entitled *Monostatic and Bistatic Backscattering Measurements from the Deep Ocean Bottom*, Journal of Acoustical Society of America, Vol. 50, No. 1, Part 2, 1971. The method discussed in the above said article and well known in the art requires that the sound sources or signals and receiver be aligned vertically, to insure that the insonified area is circular, with all points on its periphery having the same acoustic geometry. That is, the sound signal should be directly below the hydrophone.

Figure 3:
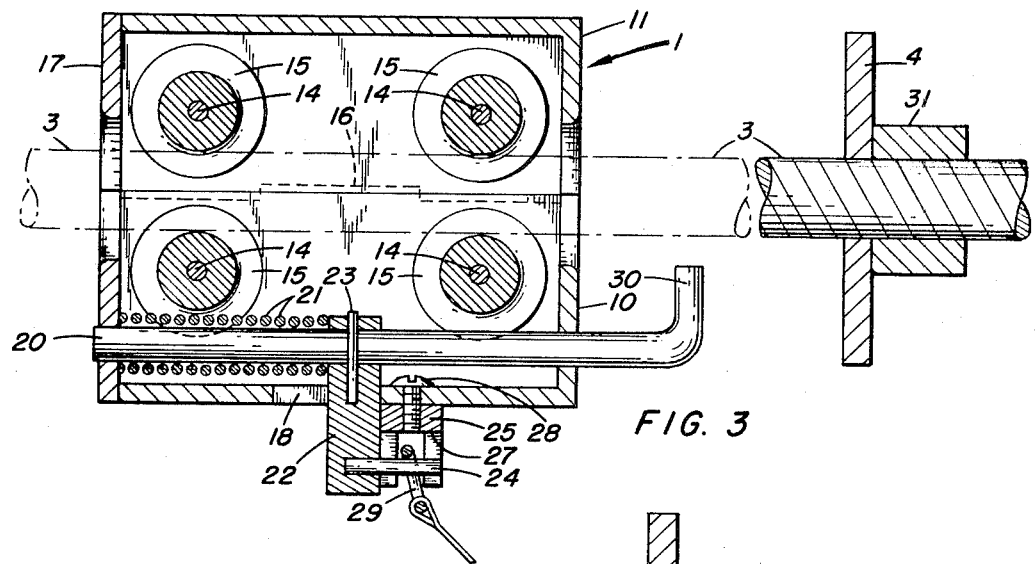
FIG. 3 shows a cross-section of the trolley with the latch member in its holding position.
Figure 5:
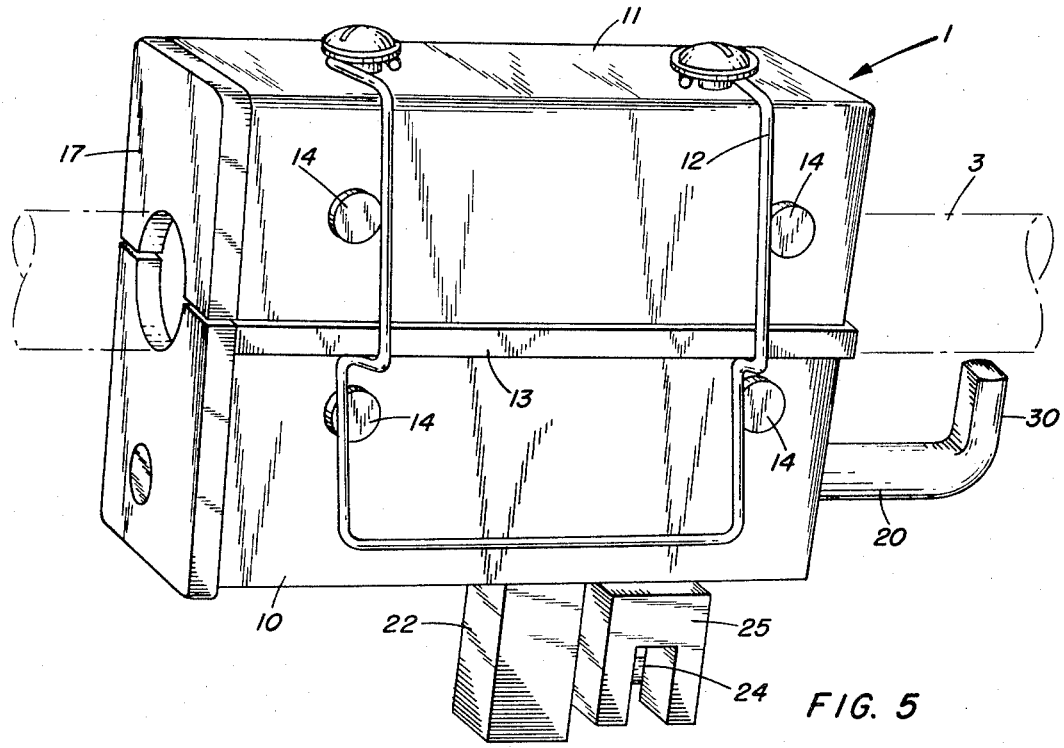
FIG. 5 is a perspective view of the trolley when closed about the cable.
Figure 6:
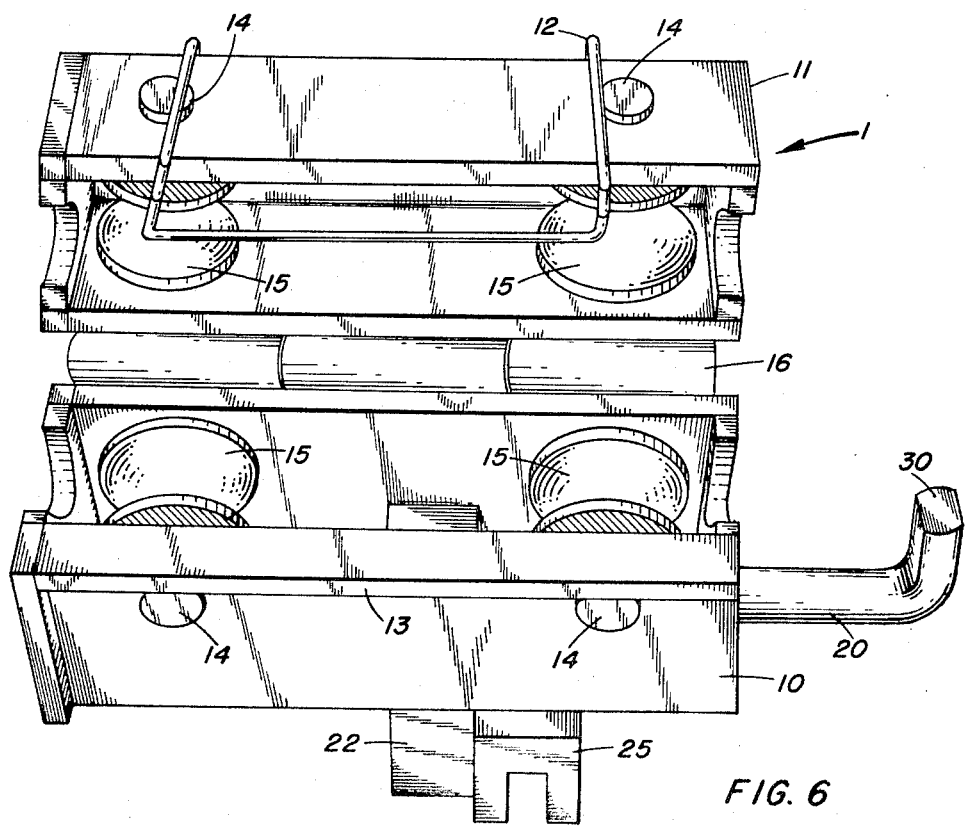
FIG. 6 is a perspective view of the trolley in an open position for reception of the cable.

FIG. 3 shows the trolley 1 mounted on cable 3. Cable 3 is inserted in trolley 1 when the trolley is in the position of FIG. 6. The trolley 1 is then closed as shown in FIG. 5 by locking member 12 over shoulder 13. Top body member 11 is attached to bottom body member 10 by hinge 16. Pin members 14 mount rollers 15 onto the body members. Rollers 15 allow easy movement of trolley 1 along cable 3. Rod member 20 is slidably received in the openings or rear plate 17 and body member 10, and is biased by spring 21 to the position shown in FIG. 3. Release lever 22 is attached to rod 20 by pin 23 and is moveable in slot 18. Pin member 24 is received in slot 27 to hold ring 29 in place. Ring 29 is attached to the sound signal or other object by any suitable means such as a cord or wire.

Figure 4:
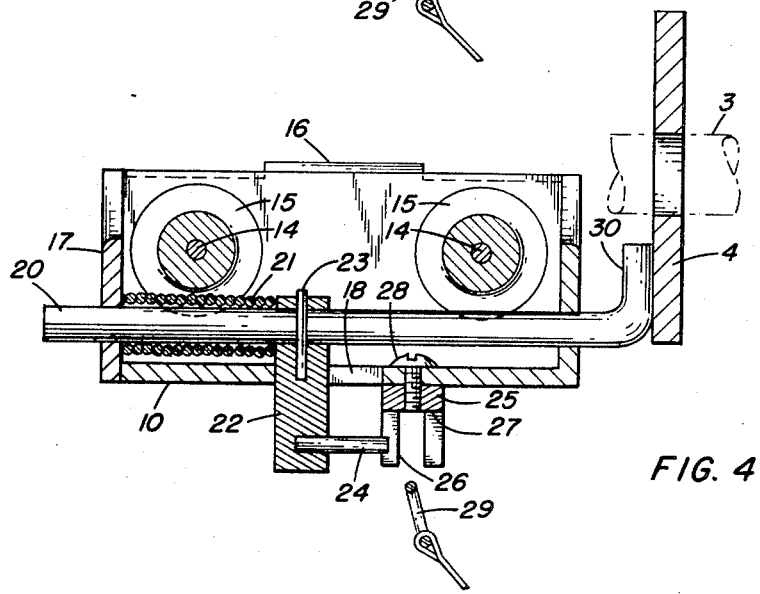
FIG. 4 shows the latch mechanism in its releasing position.

Stop plate 4 is attached to cable 3 by any suitable means such as ring 31. When end 30 of rod 20 abuts stop plate 4 or other objects such as a hydrophone or another trolley, rod 20 is depressed into the position shown in FIG. 4. In that position pin 24 is moved from slot 27 to allow ring 29 to move out of slot 26 and thereby release the object or sound signal to which is attached to ring 29.

Any reasonable number of trolleys may be used on any one cable. When more than one trolley is used on any one cable without retrieving the first used trolleys, the end 30 of rod 20 will abut the previously sent trolley and the previously sent trolley (and the previously sent trolley) will act in the place of stop plate 4 to move the rod 20 to the position shown in FIG. 4. The trolleys are pulled up with the cable when the testing is finished and they may be re-used many times.

It has been shown that vertical alignment between the sound sources or signals and the deep hydrophone is assured as much as possible by dropping the sound sources or signals along the catenary of the supporting cable 3 by means of the trolley. The sound signal 2, such as an explosive charge, falls free to its detonation depth directly below the hydrophone. This method of dropping the charges can be used either for bistatic or monostatic reverberation measurement at any angle, depending on the depth of the hydrophone and the vertical distance between it and the detonation depth of the charge. The stop plate should be near the hydrophone to insure vertical alignment, since it is difficult to know beforehand what the exact catenary of the cable will be. With this geometry the scattered return angle cannot be less than, but only greater than or roughly equal to, the incidence angles. By so doing, accurate measurements of acoustic bacscattering is achieved.

Obviously many modifications and variations of the present invention are possible in light of the above teachings. It is therefore to be understood that, within the scope of the appended claims, the invention may be practiced otherwise than as specifically described.

What is claimed is:

1. Apparatus for dropping a sound signal directly below an underwater hydrophone comprising:
    a cable adapted to be connected to a ship;
    a hydrophone connected to said cable; and
    releaseable means for carrying the sound signal along the cable to said hydrophone and automatically releasing said sound signal at the location of said hydrophone; said releaseable carrying means comprising:
    a first body member having at least one roller mounted therein;
    a second body member connected by a hinge to said first body member and having at least one roller mounted therein;
    a rod member slideably received in said second body member and biased to a first position;
    a pin connected to the rod member and moveable therewith;
    slot means on said second body member for receiving the pin whereby in one position of the rod member the pin and slot means cooperate to couple a ring to the releaseable carrying means, and in another position of the rod member the pin is moved from the slot means to release said ring.

2. The device of claim 1 wherein a stop plate is located on the cable adjacent said hydrophone and cooperates with said rod member to move said rod member from the first to the second position.

3. The device of claim 1 wherein said sound signal is connected to said ring.

4. The device of claim 1 wherein a catch means on one of said body members cooperates with the other of said body members to lock the releaseable carrying means onto the cable.

5. A trolley for transporting an object to a desired position on a line comprising:
    a body moveably mounted on a line by at least one roller on each side of the line;
    a rod slideably received and axially moveable in the body;
    said rod having a first and a second positiion; and
    means associated with said rod for holding the object in the first position of said rod and releasing the object in the second position of said rod.

6. The device of claim 5 wherein said rod is biased to said first position.

7. The device of claim 6 wherein a member on said line is adapted to be abutted by an end of said rod to thereby move said rod to the second position.

8. The device of claim 7 wherein said member is a trolley.

9. The device of claim 5 having another roller on each side of the line to ensure alignment of the rod with the member on said line.

10. The device of claim 5 wherein said line is centrally mounted with respect to said body.

11. The device of claim 5 wherein said body is divided into two connectable body parts.

12. The device of claim 11 wherein said body parts are hinged together at one side and latched together at another side.

* * * * *